United States Patent [19]

Kitai et al.

[11] 4,229,089
[45] Oct. 21, 1980

[54] AUTOMATIC FOCUSING DEVICE FOR CAMERA

[75] Inventors: Kiyoshi Kitai; Eiichi Onda; Tomoo Yonemoto; Shinji Nagaoka, all of Yotsukaido, Japan

[73] Assignee: Seiko Koki Kabushiki Kaisha, Tokyo, Japan

[21] Appl. No.: 961,725

[22] Filed: Nov. 17, 1978

[30] Foreign Application Priority Data

Nov. 18, 1977 [JP] Japan ............................ 52/138732

[51] Int. Cl.² ..................... G03B 3/00; G03B 17/38
[52] U.S. Cl. ................................ 354/25; 354/195; 354/266; 354/268
[58] Field of Search ............... 354/25, 168, 169, 195, 354/198, 237, 266–268, 289, 162, 163; 352/139, 140, 178

[56] References Cited

U.S. PATENT DOCUMENTS

| | | | |
|---|---|---|---|
| 3,720,148 | 3/1973 | Harvey | 354/168 X |
| 4,053,240 | 10/1977 | Aizawa et al. | 356/4 |
| 4,080,531 | 3/1978 | Stauffer | 250/204 |
| 4,093,365 | 6/1978 | Isono | 352/140 |
| 4,124,857 | 11/1978 | Hauser et al. | 354/198 |

Primary Examiner—L. T. Hix
Assistant Examiner—William B. Perkey
Attorney, Agent, or Firm—Robert E. Burns; Emmanuel J. Lobato; Bruce L. Adams

[57] ABSTRACT

An automatic focusing device for an automatic focusing camera of the double image coincidence focusing type. A coupling mechanism causes an focus detecting movable mirror perform scanning motion according as the stroke of shutter releasing operation. Interlocking with the push-down of the shutter release button, focus detecting motion is performed while the distance from the focal plane to the photographing objective is indicated and/or memorized.

During the first half of shutter releasing operation, focus detection and indication and/or memorization of the distance from the focal plane to the photographing objective are performed by the scanning motion of the movable mirror, and during the latter half of the shutter releasing operation, the indication and/or the lense focusing mechanism are controlled by a signal motion corresponding to the memorized value.

The memorized value is scanned interlocked with the movement of a timing member released by shutter releasing operation or a focusing member and a lens displacement regulating mechanism is controlled by a signal motion corresponding to the memorized value.

5 Claims, 5 Drawing Figures

AUTOMATIC FOCUSING DEVICE FOR CAMERA

BACKGROUND OF THE INVENTION

This invention relates to an automatic focusing device which automatically adjusts a camera photographing lens to a focus position by an electrical signal developed at the detection of the focus condition.

In the conventional automatic focusing device, the principle of a double image coincidence type range finder having a pair of photoelectric cells has been used, wherein the photographing lens is fixed at the focus signal given when the images of a fixed mirror and of a movable mirror interlocked with the photographing lense coincide. This method has a disadvantage in that photographing is performed with the photographing lense displaced to the infinite range or to the nearest range setting if the focus signal is not given when the focus detection is impossible because the image signal of the movable mirror is given after the photographing lens started moving driven by some power device. For instance, in the conventional method as shown in FIG. 1, the lens tube (k) released by depressing the release button (not shown) starts moving pulled by a spring (1) in the direction shown by an arrow. A movable mirror (b) interlocked with the lense tube (k) performs scanning from an infinite range to the nearest range. The incident rays reflected by the fixed mirror (a) are imaged at the photoelectric cell (e), while the incident rays reflected by the movable mirror is imaged at the photoelectric cell (f). Those images are compared by a coincide detecting module (g) and when the output of the photoelectric cells (e) and (f) coincided, an electromagnet (h) connected to an output circuit is demagnetized so that an armature lever (i) is released to engage with a retaining section (m) of the lens tube (k) stopping the movement of the lense tube (k) at the in-focus position. A problem arises when focus detection is impossible. In that case the electromagnet is kept magnetized so that the lens tube (k) is allowed to move as far as the extremity of its stroke where the photographing mechanism is actuated with the lense set in focus of the nearest range. The elements (Z) and (Y) applicable to the present invention are shown by dotted lines to indicate that they are not part of the conventional automatic focusing mechanism.

An object of the present invention is to provide an automatic focusing device having a system which checks the operation of the shutter or a system which send warning signals when focus detection is impossible.

Another object of the invention is to improve the accuracy of focus detection.

DESCRIPTION OF THE PREFERRED EMBODIMENTS

Figure 1:
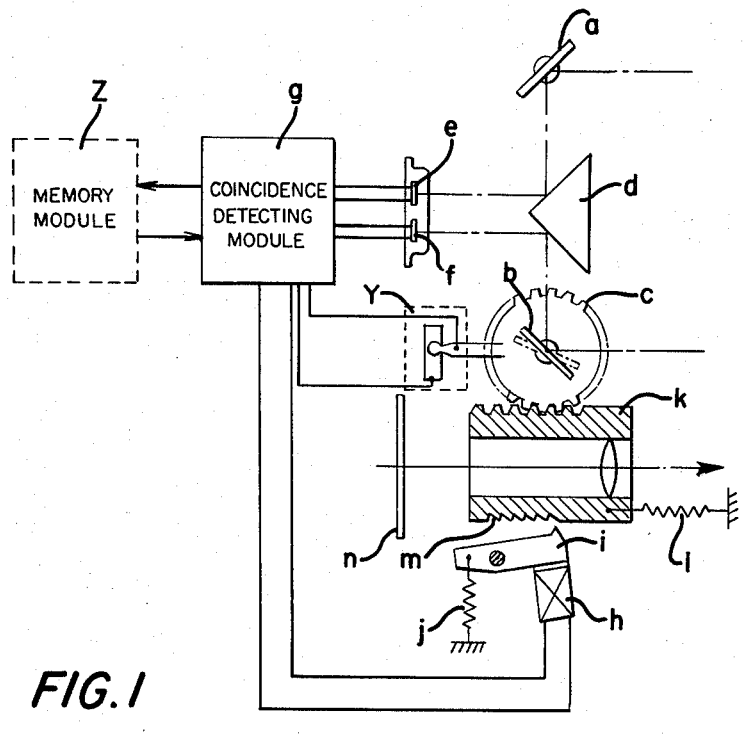
FIG. 1 illustrates a conventional automatic focusing device.

In the drawings, the reference numerals and coesponding elements of the illustrated embodiments of the invention are as follows; 1, 21 and 31: release plate; 2, 32 and 42: scan lever; 3 and 33: actuating lever; 4, 34 and 44: movable mirror; 5 and 35: timing member; 6 and 36: hook member; 7 and 37: focus adjusting member; 8 and 38: electromagnet; 10: shutter start lever; 11: range indicating plate; 39: armature.

Figure 2:
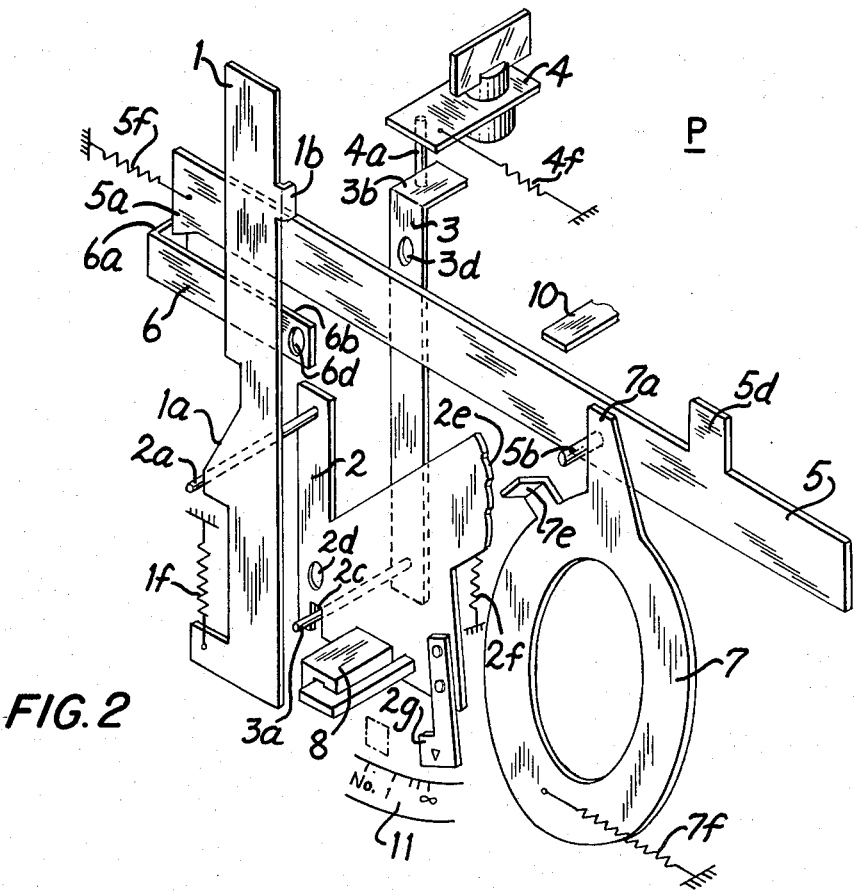
FIGS. 2 to 5 show a first, second, third and fourth embodiments of the present invention, respectively, each illustrated in charged state.

FIG. 2 illustrates a first embodiment of this invention where the automatic focusing device is in a charged state. A release plate (1) having a cam portion (1a) and a raised portion or protrusion is guided on a base plate (p) so as to be vertically slidable and is biased upwards by a spring (1f). A scan lever (2) having a pin (2a), a cutout or notch (2c), stepped cam portion (2e) and an indication plate (2g) for indicating warning when focus detection is impossible is rotatably pivoted about (2d) and biased clockwise by a spring (2f). An actuating lever (3) having a pin (3a) and an arm (3b) is rotatably pivoted about (3d). An in-focus detecting movable mirror (4) having a pin (4a) is biased counterclockwise as seen from above by a spring (4f), in the drawing said movable mirror is directed towards the infinite range.

A timing lever (5) having an end portion (5a), a pin (5b) and an arm (5d) is slidably guided so as to perform horizontal movement and is biased leftwards by a spring (5f). A hook member (6) having a hook (6a) and a side (6b) is rotatably pivoted about (6d) and is biased clockwise by a spring, not shown. A focus adjusting member (7) which controls the position of the photographing lens is provided with an arm (7a) and a raised portion or protrusion (7e) and is biased counterclockwise by a spring (7f). An electromagnet (8) is connected to the output circuit of a focus detecting module. A starting member (10) starts the shutter. The reference numeral (11) indicates a range scale plate. The well known in-focus detecting system as shown in FIG. 1, wherein images on the photoelectric cells (e) and (f) reflected by the stationary mirror (a) and the movable mirror (b), respectively, are compared at the focus detecting module (g), is applicable to the arrangement of the in-focus detecting mirrors and the photoelectric cells for focus detection and the focus detecting module of the present invention.

Explanation will now be made on the operation of the first embodiment of the invention.

When the shutter releasing button is depressed the release plate (1) is moved downwards closing the power switch, not shown, so that the focus detecting module is supplied with electricity. Successive downward movement of the release plate (1) allows clockwise rotation of the scan lever (2) pulled by the spring (2f) while the pin (2a) follows the cam portion (1a), consequently, the actuating lever (3) is driven clockwise by the cutout (2c) engaged with pin (3a). The movable mirror (4) is rotated by the spring (4f) as the actuating lever (3) rotates clockwise in accordance with the rotation of the scan lever (2). Accordingly, with successive downward movement of the release plate (1), the movable mirror continues rotating from the infinite range position towards the nearest range position and when the images reflected by the movable mirror and the stationary mirror coincide, the coincidence detecting module develops the in-focus signal so that the electromagnet (8) connected to the output circuit of the coincidence detecting module is excited. The excited electromagnet (8) attracts and hold the scan lever (2) at the in-focus position so that the movable mirror (4) also stops rotating. The range to the photographing object may be indicated by the indicating plate (2g) fixed to the scan lever (2).

When focus detection is impossible, the scan lever rotates as far as a prefixed position beyond the nearest range position and a warning sign is indicated in the viewfinder or on the front face of the camera by the operation of the indicating plate (2g), or successive movement of the release plate (1) is checked by means of a device well known. When the in-focus position is detected, the release lever moves downwards successively until the raised portion or protrusion (1b) turns the hook member (6) counterclockwise so that the timing member (5) is released. Then the timing member (5) moves leftwards pulled by the spring (5f) rendering the focus adjusting member (7) free to follow the pin (5b) and to rotate counterclockwise pulled by the spring (7f) drawing out the photographing lense from the infinite range position towards the nearest range position until the raised portion (7e) hits and rests on the stepped cam (2e) of the scan lever (2) which is previously fixed at the in-focus position so that the photographing lens is stopped at the in-focus position.

The timing member (5) moves further leftwards and stops after the arm (5d) has pushed down the start lever (10) and the shutter has started. When the pressing of the release button is terminated after the completion of the shutter operation, the release plate (1) is pulled upwards by the spring (1f) and returns to the rest position releasing the pressing on the hook member (6) and opening the power switch. When the power switch is opened, the electromagnet is demagnetized and the attraction of the scan lever (2) is terminated so that the scan lever (2) and the movable mirror (4) return to their rest position pulled by respective springs.

In charging the device of this invention, the timing member (5) is pulled rightwards against the force of the spring (5f) by means of method well known and is pulled so far that the timing member is locked by the hook member (6) as shown in FIG. 2, while the pressing on the shutter start lever (10) is terminated and the focus adjusting member (7) is rotated clockwise against the force of the spring (7f) until it is returned to the prefixed nearest range position.

Figure 3:
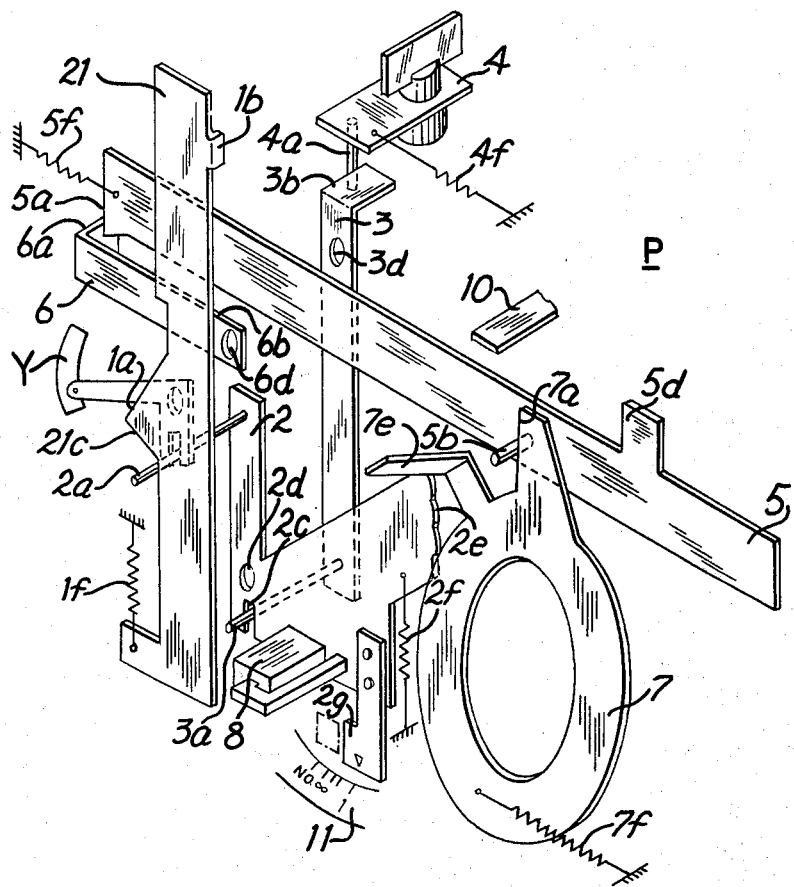

FIG. 3 illustrates a second embodiment of this invention wherein the automatic focusing device is shown in the charged state. In the drawing, the members substantially identical with those of the first embodiment are indicated with the same reference numerals, respectively, and members partially modified are indicated with the numerals produced by adding 20 to the respective reference numerals of the first embodiment in order to simplify the explanation.

Explanation will be made of the operation of the second embodiment.

When a release plate (21) moves downwards in response to the pressing on the shutter release button, a power switch, not shown, is closed and electricity is applied to the coincidence detecting module first, then in response to with the successive downward movement of the release plate (21), a cam (21c) of the release plate (21) pushes a pin (2a) of the scan lever (2) so that the scan lever (2) is rotated counterclockwise against the force of a spring (2f), so that a movable mirror (4) is caused to rotate clockwise against the force of a spring (4f) from previously fixed nearest range position towards the infinite range position through the rotation of the actuating lever (3). The movable mirror (4) keeps rotating in accordance with successive downward movement of the release plate (21) until the output signals from the movable mirror (4) and the stationary mirror coincide, and the coincidence detecting module develops a coincidence signal which is memorized by a memory module (Z), shown by dotted lines in FIG. 1, or until the displacement of a movable mirror (4) is converted into the resistance by means of a variable resistance (Y), shown by dotted lines in FIG. 1, and the resistance signal is memorized by the memory module (Z). When focus detection is impossible for some reason and the coincidence signal can not be obtained, a warning may be given or further movement of the release plate may be checked.

After the coincidence signal has been memorized, the release plate moves further so that the pin (2a) of the scan lever (2) follows the cam surface of the cam (1a), the scan lever (2) starts clockwise rotation by the force of the spring (2f) and the movable mirror (4) starts return rotation by the force of the spring (4f) from the infinite range position towards the nearest range position while the signal derived from the light reflected by the movable mirror (4) is compared with the previously memorized value. When the output obtained from the comparison operation coincides with the previously memorized value, the coincidence detecting module develops in-focus signal and the output circuit applies electricity to the electromagnet (8) so that the electromagnet is energized and attracts the scan lever (2) to fix it at the in-focus position. The indication plate (2g) fixed to the scan lever (2) may be adapted to indicate the in-focus range. If focusing is impossible and an in-focus signal is not developed for some reason, a warning sign may be indicated or successive movement of the release plate (21) may be checked as in the first embodiment.

When the in-focus position is detected, the release plate (21) moves downwards successively until the raised portion or protrusion (1b) turns the hook member (6) counterclockwise so that the timing member (5) moves leftwards pulled by the spring (5f) rendering the focus adjusting member (7) free to follow the pin (5b) pulled by the spring (7f) and to rotate counterclockwise drawing out the photographing lense from the prefixed nearest range position towards the infinite range position until the raised portion (7e) and rests on the stepped cam (2e) of the scan lever (2) which is previously fixed at the in-focus position so that the photographing lens is stopped at the in-focus position. The timing member (5) moves leftwards still further and the arm (5d) pushes the shutter start lever (10) so that the shutter is started, then, the timing lever stops.

Warning sign may be indicated by switching on a lamp instead of indicating by means of the indication plate (2g).

Figure 4:
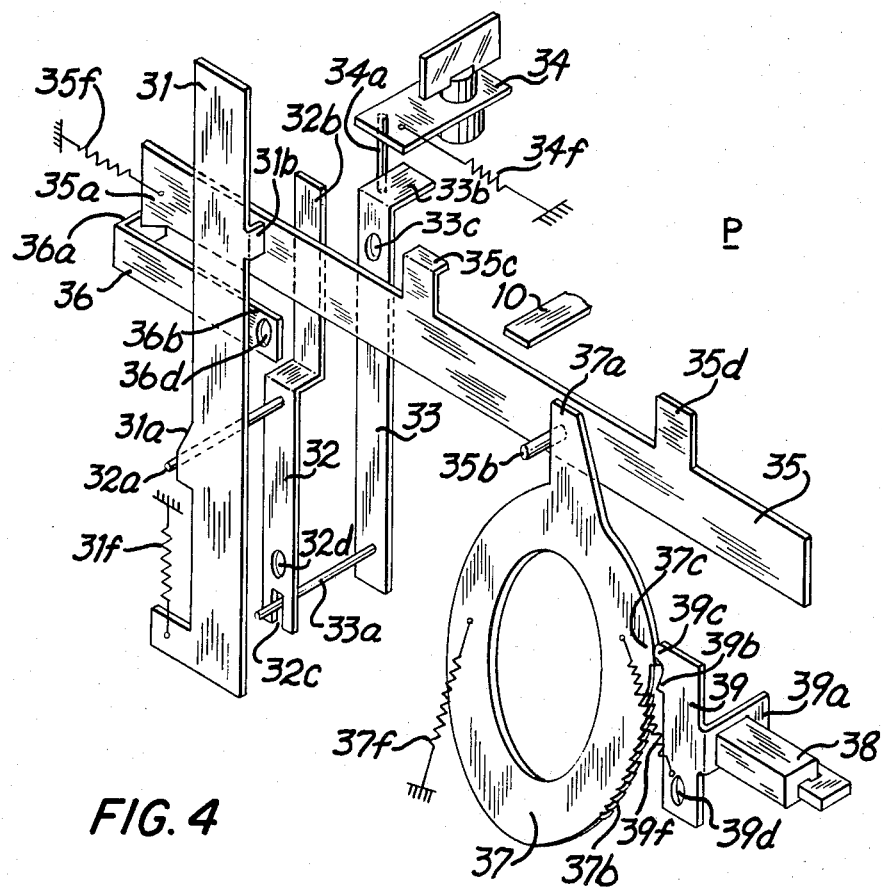

FIG. 4 illustrates a third embodiment of this invention wherein the automatic focusing device is shown in the charged state. A release plate (31) having a cam portion or protrusion (31a) and a raised portion (31b) is slidably guided on the base plate (P) so as to move vertically and is biased upwards by a spring (31f). A scan lever (32) having a pin (32a), an arm (32b) and a cutout or notch (32c) is pivotally supported so as to rotate about (32d). A movable mirror (34) having a pin (34a) is biased counterclockwise seen from above by a spring (34f). In the direction of drawing the movable mirror (34) is shown facing in the infinite range. A timing member (35) having a side (35a), a pin (35b), a raised portion or protrusion (35c) and an arm (35d) is slidably guided so as to move horizontally and is biased leftwards by a spring (35f). A hook member (36) having a hook (36a) and a side (36b) is pivotaly supported so as to rotate about (36d) and is biased clockwise by a spring, not shown. A focus adjusting member (37) which controls the displacement of the lense having an arm (37a), ratchet teeth (37b) and a a side (37c) is biased counterclockwise by a spring (37f). An electromagnet (38) is connected to the output circuit of the focus detecting module. An armature lever (39) having an armature (39a), a retaining pawl (39b) and a side (39c) is fixed on a shaft (39d) and is biased counterclockwise by a spring (39f). A shutter start lever (10) actuates the shutter.

In operation, when the release plate (31) starts moving downwards in response to pressing of the shutter release button, first, the release plate (31) closes the power switch, not shown, so that electricity is applied to the focus detecting module and the electromagnet (38). In the next step, the pin (32a) of the scan lever (32) moves along the cam (31a) of the release plate (31) so that the actuating lever (33) allows the movable mirror (34) to rotate counterclockwise pulled by the spring (34f) from the infinite range position to the prefixed nearest range position. When the signals from the movable mirror and the stationary mirror coincide, the signal from the coincidence module is memorized by the memory module (Z), shown by dotted lines in FIG. 1, or the displacement of the movable mirror is converted into an electric resistance by the variable resistor (Y), shown by dotted lines in FIG. 1, and then memorized by the memory module (Z).

In response to succesive downward movement of the release plate (31), the raised portion or protrusion (31b) presses the side (36b) of the hook member (36) so that the hook member (36) rotates counterclockwise and releases the timing member (35). Then, moving leftwards pulled by the spring (35f), the timing member (35) first pushes the arm (32b) of the scan lever (32) with the raised portion (35c). The movement of the scan lever (32) is interlocked through the actuating lever (33) with the movable mirror (34) so that the movable mirror (34) is rotated against the force of the spring (34f) from the prefixed nearest range position towards the infinite range position and the light from the mirror is compared with the memorized value while the focus adjusting member (37) starts counterclockwise rotation following the movement of the pin (35b) pulled by the spring (37f) maintaining a predetermined relation with the movement of the movable mirror (34). When the output obtained by the comparison operation coincides with the previously memorized value, the coincidence detecting module develops the in-focus signal and cuts off electricity to the electromagnet (38) connected to the output circuit of the coincidence detecting module. When the electromagnet is demagnetized, the armature (39) is released to turn counterclockwise pulled by the spring (39f) so that the pawl (39b) comes into engagement with a tooth of the ratchet teeth (37b) to lock the rotation of the focus adjusting member (37) thus controlling the position of the photographing lens. The timing member (35) moves leftwards successively and stops after it has pressed the shutter start lever (10) and has started the shutter with the arm (35d) around the final range of its stroke.

After the completion of the shutter operation, when the pressing on the shutter release button is terminated, the release plate (31) is pulled back upwards by the spring (31f) setting free the hook member (36), opening the power switch and stops at the rest position. In charging the device, the timing member (35) is pushed back rightwards by means of a mechanism well known against the force of the spring (35f) terminating the pressing of the arm (35d) on the shutter start lever (10), also terminating the pressing of the raised portion (35c) on the arm (32b) of the scan lever (32) so that the movable mirror (34) is allowed to return to the infinite range position pulled by the spring (34f), and consequently, the focus adjusting member (37) is rotated clockwise by the pin (35b) as far as the prefixed nearest range position while the armature (39) is rotated clockwise by the side (37c) of the focus adjusting member (37) so that the armature (39a) is pressed against the electromagnet (38). Finally the timing member (35) is retained by the hook member (36) at the charged position as shown in FIG. 4.

In the second and third embodiments, the mechanism and arrangement which memorize the displacement of the movable mirror after changing it into the electric resistance, may be replaced with a member interlocked with the operation of the movable mirror, and the comparison with the memory may be replaced with a member interlocked with the movable mirror or the photographing lens.

Figure 5:
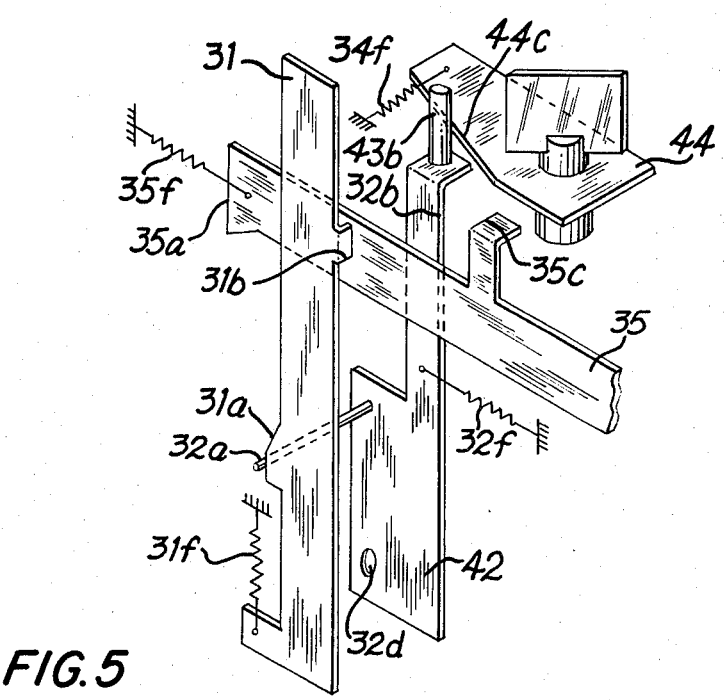

FIG. 5 illustrates a fourth embodiment of the present invention wherein the automatic focusing device is shown in a charged state. The interlocking mechanism of the third embodiment to actuate the movable mirror (34) by the operation of the release plate (31) and the timing member (35) is modified into the arrangement of a scan lever (42) and a movable mirror (44). In order to avoid duplication of the explanation, the members substantially identical and which perform a substantially identical operation as those of the third embodiment are indicated with the same reference numerals, respectively, and members partially modified are indicated with the numerals produced by adding 10 to the respective reference numerals of the third embodiment.

In this embodiment, as mentioned above, it is possible to indicate the range of the photographing object before photographing and the warning indication and release locking mechanisms are simply constructed because focus detection is performed in connection with the release motion, and also the time for the series of stages of the device operation is reduced because focus detection is performed during the release operation.

Furthermore, memory of the range of the photographing object is made possible during the release operation, therefore, a framing restriction, that requires to always arrange the main portion of the object at a prefixed position of the view finder as is necessary with the conventional automatic focusing camera, is relaxed.

It is also possible to control the displacement of the photographing lense by plural range detecting operation, therefore, erroneous operation due to false signals and disturbance is prevented while the accuracy is improved. Still further, the accuracy of lens displacement control is improved as the lens drawing-out is controlled by a member which performs stroke motion.

We claim:

1. In an automatic focusing mechanism, for a double image coincidence type automatic focusing camera, including a release member movable from a first postion through a predetermined stroke to a second position for releasing a camera shutter, and a movable mirror for scanning an object to be photographed in response to actuation of said release member, the improvement comprising: biasing means for biasing said release member toward said first position and for returning said release member to said first position; and mechanical scanning means cooperative with said release member for scanning said movable mirror through one scan each time said release member travels from said first position through a certain initial portion of its stroke before reaching said second position and for returning said movable mirror to an initial pre-scan position as said biasing means returns said release member to said first position, whereby said movable mirror can be repeatedly scanned without releasing the camera shutter by repeated movement of said release member through the certain initial portion of its stroke.

2. In an automatic focusing mechanism according to claim 1, said improvement further comprising means for indicating the distance from a camera focal plane to an object to be photographed each time said movable mirror is scanned and before said release member reaches said second position.

3. In an automatic focusing mechanism according to claim 1, said improvement further comprising means for memorizing the distance from a camera focal plane to an object to be photographed each time said movable mirror is scanned and before said release member reaches said second position.

4. In an automatic focusing mechanism according to claim 3, the improvement further comprising means for comparing a signal corresponding to camera lens position with the memorized distance value, and means cooperative with said comparing means for displacing a camera lens to a focused position before said release member reaches said second position and the camera shutter is released.

5. In an automatic focusing mechanism according to claim 1, said biasing means comprising a spring connected to said release member for continually pulling said release member toward said first position.

* * * * *